United States Patent [19]
Tomaszewski et al.

[11] Patent Number: 6,122,272
[45] Date of Patent: Sep. 19, 2000

[54] CALL SIZE FEEDBACK ON PNNI OPERATION

[75] Inventors: Marek Tomaszewski, Fremont; Ashok Chippa, San Jose; Ethan Spiegel, Mountain View, all of Calif.

[73] Assignee: Cisco Technology, Inc., San Jose, Calif.

[21] Appl. No.: 08/863,031

[22] Filed: May 23, 1997

[51] Int. Cl.[7] ............................... H04L 12/28; H04J 1/16
[52] U.S. Cl. ............................. 370/351; 370/230
[58] Field of Search ................... 370/230, 235, 370/236, 254, 392, 395, 397, 389, 351, 400

[56] References Cited

U.S. PATENT DOCUMENTS

| | | | |
|---|---|---|---|
| Re. 33,900 | 4/1992 | Howson | 370/105 |
| 4,131,767 | 12/1978 | Weinstein | 179/170.2 |
| 4,161,719 | 7/1979 | Parikh et al. | 340/147 SY |
| 4,316,284 | 2/1982 | Howson | 370/105 |
| 4,397,020 | 8/1983 | Howson | 370/105 |
| 4,419,728 | 12/1983 | Larson | 364/200 |
| 4,424,565 | 1/1984 | Larson | 364/200 |
| 4,437,087 | 3/1984 | Petr | 340/347 DD |
| 4,438,511 | 3/1984 | Baran | 370/19 |
| 4,439,763 | 3/1984 | Limb | 340/825.5 |
| 4,445,213 | 4/1984 | Baugh et al. | 370/94 |
| 4,446,555 | 5/1984 | Devault et al. | 370/94 |
| 4,456,957 | 6/1984 | Schieltz | 364/200 |
| 4,464,658 | 8/1984 | Thelen | 340/825.5 |
| 4,499,576 | 2/1985 | Fraser | 370/60 |
| 4,506,358 | 3/1985 | Montgomery | 370/60 |
| 4,507,760 | 3/1985 | Fraser | 365/221 |
| 4,532,626 | 7/1985 | Flores et al. | 370/85 |
| 4,644,532 | 2/1987 | George et al. | 370/94 |
| 4,646,287 | 2/1987 | Larson et al. | 370/60 |
| 4,677,423 | 6/1987 | Benvenuto et al. | 340/347 DD |
| 4,679,189 | 7/1987 | Olson et al. | 370/60 |
| 4,679,227 | 7/1987 | Hughes-Hartogs | 379/98 |
| 4,723,267 | 2/1988 | Jones et al. | 379/93 |
| 4,731,816 | 3/1988 | Hughes-Hartogs | 379/98 |
| 4,750,136 | 6/1988 | Arpin et al. | 364/514 |

(List continued on next page.)

FOREIGN PATENT DOCUMENTS

| | | |
|---|---|---|
| 0 384 758 A2 | 2/1990 | European Pat. Off. ........ H04L 12/56 |
| 0 431 751 A1 | 11/1990 | European Pat. Off. ........ H04L 12/46 |
| 0 567 217 A2 | 10/1993 | European Pat. Off. ........ H04L 12/46 |
| WO 93/07569 | 4/1993 | WIPO ........................... G06F 13/40 |
| WO 93/07692 | 4/1993 | WIPO ........................... H04J 3/24 |
| WO 94/01828 | 1/1994 | WIPO ........................... G06F 13/40 |
| WO 95/20850 | 8/1995 | WIPO ........................... H04L 12/56 |

OTHER PUBLICATIONS

Stallings, Data and Computer Communications, PP:329–333, 1996.

William Stallings, Data and Computer Communications, PP: 329–333, Prentice Hall, Upper Saddle River, New Jersey 07458.

Allen, M., "Novell IPX Over Various WAN Media (IPXWAN)," Network Working Group, RFC 1551, Dec. 1993, pp. 1–22.

(List continued on next page.)

*Primary Examiner*—Douglas W. Olms
*Assistant Examiner*—David R Vincent
*Attorney, Agent, or Firm*—Swernofsky Law Group

[57] ABSTRACT

The invention provides a method and system for selecting routes in a switching network with resource reservation, such as an ATM network. A set of routes are periodically precomputed, so that routes are known between any sending node and any receiving node, subject to resource reservation requirements. Each incoming call has its resource requirements, such as call size, compared with a selected threshold, and if the requirements exceed the threshold, a route is dynamically recomputed for the call. Other aspects of routing may be responsive to the calls' resource requirements. For example, a ratio of required resources with quality-of-service restrictions to required resources without such restrictions may be used to determine whether to reject the call, responsive to the call's resource requirements. The call size may be compared against another selected threshold, and the decision to determine whether to use that ratio to reject the call may be made responsive to comparisons against one or both thresholds.

28 Claims, 1 Drawing Sheet

U.S. PATENT DOCUMENTS

| | | | |
|---|---|---|---|
| 4,757,495 | 7/1988 | Decker et al. | 370/76 |
| 4,763,191 | 8/1988 | Gordon et al. | 358/86 |
| 4,769,810 | 9/1988 | Eckberg, Jr. et al. | 370/60 |
| 4,769,811 | 9/1988 | Eckberg, Jr. et al. | 370/60 |
| 4,771,425 | 9/1988 | Baran et al. | 370/85 |
| 4,819,228 | 4/1989 | Baran et al. | 370/85 |
| 4,827,411 | 5/1989 | Arrowood et al. | 364/300 |
| 4,833,706 | 5/1989 | Hughes-Hartogs | 379/98 |
| 4,835,737 | 5/1989 | Herrig et al. | 364/900 |
| 4,879,551 | 11/1989 | Georgiou et al. | 340/825.87 |
| 4,893,306 | 1/1990 | Chao et al. | 340/94.2 |
| 4,903,261 | 2/1990 | Baran et al. | 370/94.2 |
| 4,922,486 | 5/1990 | Lidinsky et al. | 370/60 |
| 4,933,937 | 6/1990 | Konishi | 370/85.13 |
| 4,960,310 | 10/1990 | Cushing | 350/1.7 |
| 4,962,497 | 10/1990 | Ferenc et al. | 370/60.1 |
| 4,962,532 | 10/1990 | Kasiraj et al. | 380/25 |
| 4,965,772 | 10/1990 | Daniel et al. | 364/900 |
| 4,970,678 | 11/1990 | Sladowski et al. | 364/900 |
| 4,979,118 | 12/1990 | Kheradqir | 364/436 |
| 4,980,897 | 12/1990 | Decker et al. | 375/38 |
| 4,991,169 | 2/1991 | Davis et al. | 370/77 |
| 5,003,595 | 3/1991 | Collins et al. | 380/25 |
| 5,014,265 | 5/1991 | Hahne et al. | 370/60 |
| 5,020,058 | 5/1991 | Holden et al. | 370/109 |
| 5,033,076 | 7/1991 | Jones et al. | 379/67 |
| 5,054,034 | 10/1991 | Hughes-Hartogs | 375/8 |
| 5,059,925 | 10/1991 | Weisbloom | 331/1 A |
| 5,072,449 | 12/1991 | Enns et al. | 371/37.1 |
| 5,088,032 | 2/1992 | Bosack | 395/200 |
| 5,095,480 | 3/1992 | Fenner | 370/94.1 |
| 5,115,431 | 5/1992 | Williams et al. | 370/94.1 |
| 5,128,945 | 7/1992 | Enns et al. | 371/37.1 |
| 5,136,580 | 8/1992 | Videlock et al. | 370/60 |
| 5,166,930 | 11/1992 | Braff et al. | 370/94.1 |
| 5,199,049 | 3/1993 | Wilson | 375/104 |
| 5,206,886 | 4/1993 | Bingham | 375/97 |
| 5,208,811 | 5/1993 | Kashio et al. | |
| 5,212,686 | 5/1993 | Joy et al. | 370/60 |
| 5,224,099 | 6/1993 | Corbalis et al. | 370/94.2 |
| 5,226,120 | 7/1993 | Brown et al. | 395/200 |
| 5,228,062 | 7/1993 | Bingham | 375/97 |
| 5,229,994 | 7/1993 | Balzano et al. | 370/85.13 |
| 5,233,604 | 8/1993 | Ahmadi et al. | 370/60 |
| 5,237,564 | 8/1993 | Lespagnol et al. | 370/60.1 |
| 5,241,682 | 8/1993 | Bryant et al. | 395/800 |
| 5,243,342 | 9/1993 | Kattemalalavadi et al. | 341/106 |
| 5,243,596 | 9/1993 | Port et al. | 370/94.1 |
| 5,247,516 | 9/1993 | Bernstein et al. | 370/82 |
| 5,249,178 | 9/1993 | Kurano et al. | 370/60 |
| 5,253,251 | 10/1993 | Aramaki | |
| 5,255,291 | 10/1993 | Holden et al. | 375/111 |
| 5,260,933 | 11/1993 | Rouse | 370/14 |
| 5,260,978 | 11/1993 | Fleischer et al. | 375/106 |
| 5,268,592 | 12/1993 | Bellamy et al. | 307/43 |
| 5,268,900 | 12/1993 | Hluchyj et al. | 370/94.1 |
| 5,271,004 | 12/1993 | Proctor et al. | 370/60 |
| 5,274,631 | 12/1993 | Bhardwaj | 370/60 |
| 5,274,635 | 12/1993 | Rahman et al. | 370/60.1 |
| 5,274,643 | 12/1993 | Fisk | 370/94.1 |
| 5,280,470 | 1/1994 | Buhrke et al. | 370/13 |
| 5,280,480 | 1/1994 | Pitt et al. | 370/85.13 |
| 5,280,500 | 1/1994 | Mazzola et al. | 375/17 |
| 5,283,783 | 2/1994 | Nguyen et al. | 370/16.1 |
| 5,287,103 | 2/1994 | Kasprzyk et al. | 340/825.52 |
| 5,287,453 | 2/1994 | Roberts | 395/200 |
| 5,289,462 | 2/1994 | Ahmadi et al. | 370/60.1 |
| 5,291,482 | 3/1994 | McHarg et al. | 370/60 |
| 5,305,311 | 4/1994 | Lyles | 370/60 |
| 5,307,343 | 4/1994 | Bostica et al. | 370/60 |
| 5,309,437 | 5/1994 | Perlman et al. | 370/85.13 |
| 5,311,509 | 5/1994 | Heddes et al. | 370/60 |
| 5,313,454 | 5/1994 | Bustini et al. | 370/13 |
| 5,313,582 | 5/1994 | Hendel et al. | 395/250 |
| 5,317,562 | 5/1994 | Nardin et al. | 370/16 |
| 5,319,644 | 6/1994 | Liang | 370/85.5 |
| 5,327,421 | 7/1994 | Hiller et al. | 370/60.1 |
| 5,331,637 | 7/1994 | Francis et al. | |
| 5,345,445 | 9/1994 | Hiller et al. | 370/60.1 |
| 5,345,446 | 9/1994 | Hiller et al. | 370/60.1 |
| 5,357,507 | 10/1994 | Hughes et al. | 370/60 |
| 5,359,592 | 10/1994 | Corbalis et al. | 370/17 |
| 5,361,250 | 11/1994 | Nguyen et al. | 370/16.1 |
| 5,361,256 | 11/1994 | Doeringer et al. | |
| 5,361,259 | 11/1994 | Hunt et al. | 370/84 |
| 5,365,524 | 11/1994 | Hiller et al. | 370/94.2 |
| 5,367,517 | 11/1994 | Cidon et al. | 370/54 |
| 5,371,852 | 12/1994 | Attanasio et al. | 395/200 |
| 5,386,567 | 1/1995 | Lien et al. | 395/700 |
| 5,390,170 | 2/1995 | Sawant et al. | 370/58.1 |
| 5,390,175 | 2/1995 | Hiller et al. | 370/60 |
| 5,394,394 | 2/1995 | Crowther et al. | 370/60 |
| 5,394,402 | 2/1995 | Ross | 370/94.1 |
| 5,400,325 | 3/1995 | Chatwani et al. | 370/60.1 |
| 5,408,469 | 4/1995 | Opher et al. | 370/60.1 |
| 5,416,842 | 5/1995 | Aziz | 380/30 |
| 5,422,880 | 6/1995 | Heitkamp et al. | 370/60 |
| 5,422,882 | 6/1995 | Hiller et al. | 370/60.1 |
| 5,423,002 | 6/1995 | Hart | 395/200 |
| 5,426,636 | 6/1995 | Hiller et al. | 370/60.1 |
| 5,428,607 | 6/1995 | Hiller et al. | 370/60.1 |
| 5,430,715 | 7/1995 | Corbalis et al. | 370/54 |
| 5,430,729 | 7/1995 | Rahnema | 370/94.1 |
| 5,442,457 | 8/1995 | Najafi | 358/400 |
| 5,442,630 | 8/1995 | Gagliardi et al. | 370/85.13 |
| 5,452,297 | 9/1995 | Hiller et al. | 370/60.1 |
| 5,473,599 | 12/1995 | Li et al. | 370/16 |
| 5,473,607 | 12/1995 | Hausman et al. | 370/85.13 |
| 5,485,455 | 1/1996 | Dobbins et al. | 370/60 |
| 5,490,140 | 2/1996 | Abensour et al. | |
| 5,490,258 | 2/1996 | Fenner | 395/401 |
| 5,491,687 | 2/1996 | Christensen et al. | 370/17 |
| 5,491,804 | 2/1996 | Heath et al. | 395/275 |
| 5,497,368 | 3/1996 | Reijnierse et al. | |
| 5,504,747 | 4/1996 | Sweazey | |
| 5,509,006 | 4/1996 | Wilford et al. | 370/60 |
| 5,517,494 | 5/1996 | Green | |
| 5,519,704 | 5/1996 | Farinacci et al. | 370/85.13 |
| 5,519,858 | 5/1996 | Walton et al. | 395/600 |
| 5,526,489 | 6/1996 | Nilakantan et al. | 395/200.02 |
| 5,530,963 | 6/1996 | Moore et al. | 395/200.15 |
| 5,535,195 | 7/1996 | Lee | 370/54 |
| 5,539,734 | 7/1996 | Burwell et al. | |
| 5,541,911 | 7/1996 | Nilakantan et al. | 370/13 |
| 5,546,370 | 8/1996 | Ishikawa | 369/77.2 |
| 5,555,244 | 9/1996 | Gupta et al. | 370/60 |
| 5,561,669 | 10/1996 | Lenney et al. | 370/60.1 |
| 5,583,862 | 12/1996 | Callon | 370/397 |
| 5,592,470 | 1/1997 | Rudrapatna et al. | 370/320 |
| 5,598,581 | 1/1997 | Daines et al. | 395/872 |
| 5,600,798 | 2/1997 | Cherukuri et al. | |
| 5,604,868 | 2/1997 | Komine et al. | 395/200 |
| 5,608,726 | 3/1997 | Virgile | |
| 5,617,417 | 4/1997 | Sathe et al. | 370/394 |
| 5,617,421 | 4/1997 | Chin et al. | 370/402 |
| 5,630,125 | 5/1997 | Zellweger | 395/614 |
| 5,631,908 | 5/1997 | Saxe | |
| 5,632,021 | 5/1997 | Jennings et al. | 395/309 |
| 5,634,010 | 5/1997 | Ciscon et al. | 395/200 |
| 5,644,718 | 7/1997 | Belove et al. | 395/200 |
| 5,666,353 | 9/1997 | Klausmeier et al. | 370/230 |
| 5,673,265 | 9/1997 | Gupta et al. | 370/432 |

| | | | |
|---|---|---|---|
| 5,678,006 | 10/1997 | Valizadeh et al. | 395/200 |
| 5,680,116 | 10/1997 | Hashimoto et al. | 340/827 |
| 5,684,797 | 11/1997 | Aznar et al. | 370/390 |
| 5,687,324 | 11/1997 | Green et al. | |
| 5,689,499 | 11/1997 | Hullett et al. | 370/235 |
| 5,689,506 | 11/1997 | Chiussi et al. | 370/388 |
| 5,719,864 | 2/1998 | Badger et al. | 370/395 |
| 5,724,351 | 3/1998 | Chao et al. | |
| 5,748,186 | 5/1998 | Raman | 345/302 |
| 5,754,547 | 5/1998 | Nakazawa | |
| 5,802,054 | 9/1998 | Bellenger | 370/401 |
| 5,854,903 | 12/1998 | Morrison et al. | 395/200.79 |
| 5,856,981 | 1/1999 | Voelker | 371/20.1 |
| 5,892,924 | 4/1999 | Lyon et al. | 395/200.75 |
| 5,898,686 | 4/1999 | Virgile | |
| 5,903,559 | 5/1999 | Acharya et al. | 370/355 |

OTHER PUBLICATIONS

Becker, D., "3c589.c: A 3c589 EtherLink3 ethernet driver for linux." becker@CESDIS.gsfc.nasa.gov, May 3, 1994, pp. 1–13.

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–contiguous Wildcarding," Abstract, Bellcore.

Zhang, et al., "Rate–Controlled Static–Priority Queueing," INFOCOM 1993, pp. 227–236.

CALL SIZE FEEDBACK ON PNNI OPERATION

BACKGROUND OF THE INVENTION

1. Field of the Invention

The invention relates to ATM networks.

2. Related Art

In known ATM systems, different calls can have different requirements for transmission bandwidth. The transmission bandwidth requirement for a call is termed its "size." For example, a videoconference call is considered "larger" than a simple voice call. When selecting a virtual circuit for routing each call in an ATM network, the size of the call is considered in determining which switching nodes to select for routing each call or which through, or if the call should be rejected due to a lack of transmission capacity.

Known ATM systems determine the route for the virtual circuit for each incoming call as the call enters the ATM network. However, one problem which has arisen in the art is that this operation requires substantial computation. Accordingly, while this method achieves the goal of determining the virtual circuit for each incoming call, it has the drawback of requiring substantial resources for computation, can delay processing of incoming calls, and can therefore result in lesser throughput of incoming calls by the ATM system.

One technique to reduce the computation intensity associated with route computation is to use precomputed routes. However, precomputed routes can produce paths that are less efficient from the point of view of bandwidth utilization than routes computed dynamically. It would be advantageous to dynamically route those calls which might have a significant impact on overall bandwidth utilization in the network.

Accordingly, it would be desirable to provide a method and system for selecting routes in an ATM network, which does not require excessive dynamic route computation. This advantage is achieved in an embodiment of the invention in which most routes are precomputed, but some routes are dynamically computed in response to call size, thus call size is used to determine or help determine whether a dynamically computed route should be used instead of a precomputed route.

SUMMARY OF INVENTION

The invention provides a method and system for selecting routes in a switching network with resource reservation, such as an ATM network. A set of routes are periodically precomputed, so that routes are known between any sending node and any receiving node, subject to resource reservation requirements (such as call size). Each incoming call has its resource requirements, such as call size, compared with a selected threshold, and if the requirements exceed the threshold, a route is dynamically recomputed for the call.

In alternative embodiments, other aspects of routing may also be responsive to the calls' resource requirements (such as call size). For example, a ratio of required resources with quality-of-service restrictions to required resources without such restrictions may be used to determine whether to reject the call, responsive to the call's resource requirements. In such alternative embodiments, the call size may be compared against another selected threshold, and the decision to determine whether to use that ratio to reject the call may be made responsive to comparisons against one or both thresholds.

DETAILED DESCRIPTION OF THE PREFERRED EMBODIMENT

Figure 1:
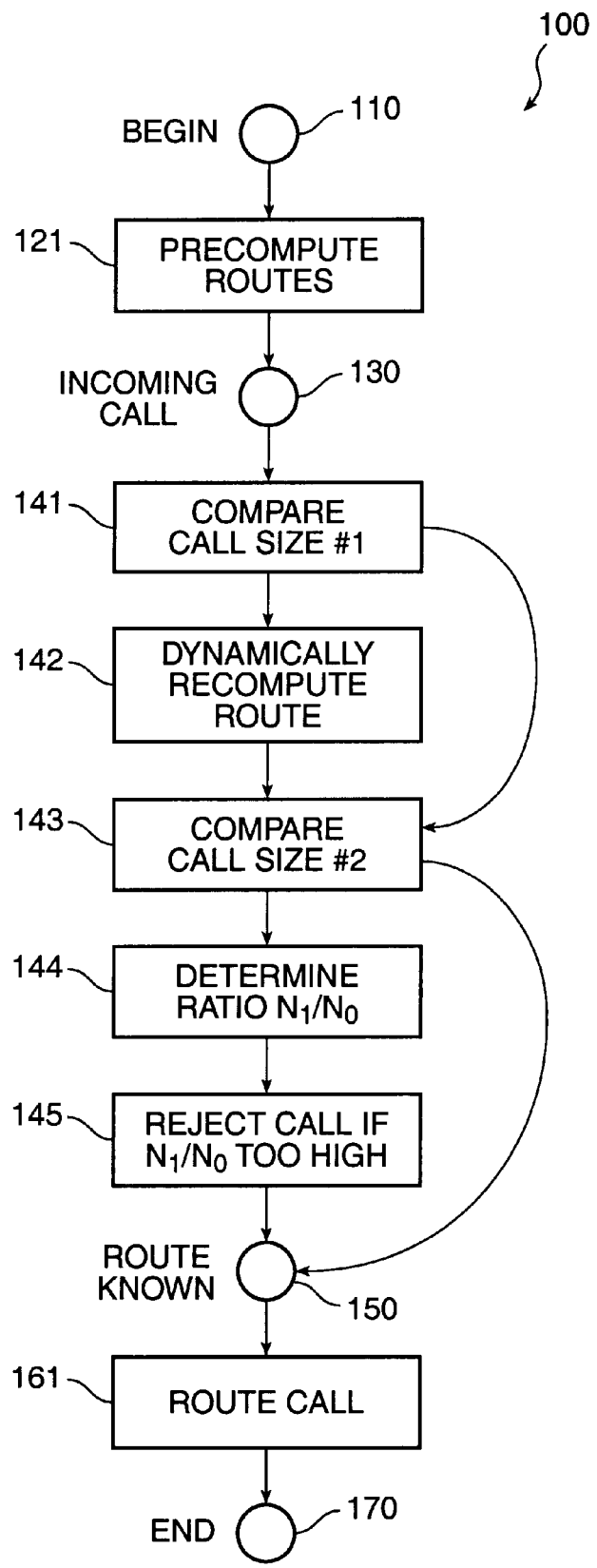
FIG. 1 shows a process flow diagram of a method for selecting routes in a switching network.

In the following description, a preferred embodiment of the invention is described with regard to preferred process steps and data structures. Those skilled in the art would recognize after perusal of this application that embodiments of the invention can be implemented using general purpose switching processors or special purpose switching processors or other circuits adapted to particular process steps and data structures described herein, and that implementation of the process steps and data structures described herein would not require undue experimentation or further invention.

Inventions described herein can be used in conjunction with inventions described in the following application:

Application Ser. No. 08/862,915, filed May 23, 1997, Express Mailing No. EM302071674, in the name of the same inventors, titled "Next Hop Selection in ATM Networks", having attorney docket number CIS-025.

This application is hereby incorporated by reference as if fully set forth herein.

Precomputed Routes or Dynamic Recomputation

FIG. 1 shows a process flow diagram of a method for selecting routes in a switching network.

A method 100 for selecting routes in a switching network includes the flow points 110 through 170, and steps therebetween. The method 100 is preferably performed in a switching network with resource reservation, such as an ATM network.

At a flow point 110, the switching network includes a set of nodes, including at least one sending node, at least one receiving node, and a plurality of routes between the sending nodes and the receiving nodes.

At a step 121, the method 100 precomputes a set of routes between each of the sending nodes and each of the receiving nodes, subject to resource reservation requirements.

The step 121 is periodically performed, so that precomputed routes are known between any of the sending nodes and any of the receiving nodes, and the routes which are known are subject to resource reservation requirements.

As used herein, the concept of "precomputed" routes includes schemes in which a set of routes, or a set of preferred routes, are determined independent of parameters of the call. This includes cases where some precomputed routes are in fact computed or partially computed at or near the time the call arrives, but are determined independent of parameters of the call such as call size. A fixed technique for determining a preferred route is a precomputed route, while a technique or selection among techniques which is responsive to the call size and determines different routes for calls having different sizes (as opposed to merely rejecting calls which are too large) is not a precomputed route.

At a flow point 130, an incoming call arrives at one of the sending nodes. The incoming call includes a designated receiving node and a set of resource requirements. For example, one such resource requirement is a call size for the incoming call.

The incoming call is preferably an incoming call in a telephone network to be routed using the ATM network.

At a step 141, the call size for the incoming call is compared with a first selected threshold. In a preferred embodiment, the first selected threshold is a static value set by an operator using a network management system for a peer group in the ATM network. For example, the static value may comprise a value such as about 1 megabit per second, or a value such as about 384 kilobits per second, so as to distinguish between ordinary voice telephone calls and videotelephone calls. In alternative embodiments, the first selected threshold may be dynamically determined in response to traffic in the ATM network or other factors. For example, the first selected threshold may be determined in response to the number and type of call requests received, so as to approximately limit the number of calls for which routes are dynamically computed to a selected limit.

At a step 142, if the call size for the incoming call exceeds the first selected threshold, the method 100 dynamically recomputes a route for the call (thus disregarding the precomputed routes). Otherwise, the method 100 does not perform the step 142.

Call Rejection For Excessive Resource Usage

At a step 143, the call size for the incoming call is compared with a second selected threshold. In a preferred embodiment, the second selected threshold is a static value; however, in alternative embodiments, the second selected threshold may be determined responsive to traffic in the ATM network or other factors, in similar manner as the first selected threshold is determined in the step 141.

At a step 144, if the call size for the incoming call does not exceed the second selected threshold, the method 100 continues with the flow point 150. Otherwise, the method 100 proceeds to determine an excess-usage ratio of required resources with quality-of-service restrictions to required resources without such restrictions.

To determine the ratio in the step 144, the method 100 performs the following sub-steps:

At a sub-step 144(*a*), the method 100 determines a first route for the incoming call without using quality of service restrictions.

At a sub-step 144(*b*), the method 100 determines a first weighted hop count n0 for the first route.

In a preferred embodiment, the first weighted hop count is computed by assigning a relatively lower administrative cost to relatively higher-speed interfaces. For example, the administrative cost for a hop can be inversely proportional to the total Maximum Cell Rate of interfaces available for that hop.

At a sub-step 144(*c*), the method 100 determines a second route for the incoming call, this time using quality of service restrictions.

The second route can require different switching nodes and can require more switching nodes than the first route, because quality of service restrictions restrict the nature of the interfaces through which the call can pass.

At a sub-step 144(*d*), the method 100 determines a second weighted hop count n1 for the second route.

In a preferred embodiment, the second weighted hop count is determined in like manner as the first weighted hop count. Thus, the second weighted hop count is computed by assigning a relatively lower administrative cost to relatively higher-speed interfaces.

At a sub-step 144(*e*), the method 100 determines the excess-usage ratio n1/n0.

At a step 145, if the excess-usage ratio n1/n0 determined in the step 144 exceeds a third selected threshold, the method 100 rejects the call.

In a preferred embodiment, the third selected threshold is a static value; however, in alternative embodiments, the third selected threshold may be determined responsive to traffic in the ATM network or other factors, in similar manner as the first selected threshold is determined in the step 141. In a preferred embodiment, the third selected threshold is an excess-usage ratio of about 1.5 to 1 for a relatively dense network, or about 2 or 3 to 1 for a relatively sparse network.

At a flow point 150, a route is known for the incoming call.

At a step 161, the incoming call is routed according to the known route.

At a flow point 170, the method 100 is complete.

Further Applicability of Resource Requirement Feedback

The resource requirements of the incoming call has broader applicability than determining (a) whether to dynamically recompute routes, or (b) whether to dynamically determine an excess-usage ratio and reject incoming calls responsive thereto.

For example, the method 100 can determine, responsive to the resources required by the incoming call (such as call size), whether to apply techniques relating to one or more of the following:

In a dynamic path recomputation protocol, such as in virtual path and virtual circuit recomputation, the call size can be used to determine for which calls to determine whether to reroute paths. For example, paths can be dynamically rerouted only for those calls which are large enough to make a significant difference.

In a system which transmits multicast information, the call size can be used to determine for which point to multipoint calls to attempt to optimize (or partially reoptimize) the multicast routing tree. Similarly, in a system which transmits multicast information and also receives point to point calls, the call size can be used to determine for which newly arrived calls to trigger an attempt to optimize (or partially reoptimize) multicast routing trees.

In other routing protocols which concern or involve dynamic path computation or resource reservation, the call size can be used to determine for which calls to attempt to perform dynamic path computation or resource reservation.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, including the steps of
precomputing a set of routes in a switching network, said routes being between a plurality of sending nodes and a plurality of receiving nodes;
receiving a request for a virtual circuit at one of said sending nodes, said request including a designated receiving node;
examining a set of resource requirements for said request; and
choosing whether to dynamically compute a new route between said one sending node and said designated receiving node, responsive to whether any of said set of resource requirements exceeds a set of selected thresholds, said thresholds determined in response to a network parameter.

2. A method as in claim 1, wherein said switching network is an ATM network.

3. A method as in claim 1, wherein said request comprises an incoming call in a telephone network.

4. A method as in claim 1, wherein said resource requirements include a call size.

5. A method as in claim 1, wherein:
said resource requirements include a call size; and
said step of choosing includes the step of comparing said call size with a selected threshold.

6. A method, including the steps of
receiving a request for a virtual circuit in a switching network, said network having a plurality of sending nodes and a plurality of receiving nodes, said request being received at a sending node;
examining a set of resource requirements for said request; and
choosing whether to dynamically compute a ratio of required resources with quality-of-service restrictions to required resources without such restrictions, responsive to whether any of said resource requirements exceeds a set of selected thresholds, said thresholds determined in response to a network parameter.

7. A method as in claim 6, wherein said switching network is an ATM network.

8. A method as in claim 6, wherein said request comprises an incoming call in a telephone network.

9. A method as in claim 6, wherein said resource requirements include a call size.

10. A method as in claim 6, wherein:
said resource requirements include a call size; and
said step of choosing includes the step of comparing said call size with a selected threshold.

11. A method as in claim 6, comprising the step of determining whether to reject said request, responsive to said dynamically computed ratio.

12. A node in a switching network, said node including:
a periodic route determination mechanism configured to periodically precompute a set of routes in said switching network, said set of routes including a plurality of sending nodes and a plurality of receiving nodes;
a receiver mechanism configured to receive a request for a virtual circuit including a designated receiving node;
a determination mechanism configured to examine a set of resource requirements for said request received by the receiver mechanism; and
a decision mechanism configured to choose whether to dynamically compute a new route between said node and said designated receiving node, responsive to whether any of said set of resource requirements exceeds a set of selected thresholds, said thresholds determined in response to a network parameter.

13. The node of claim 12, wherein said switching network is an ATM network.

14. The node of claim 12, wherein said request comprises an incoming call in a telephone network.

15. The node of claim 12, wherein said resource requirements include a call size.

16. The node of claim 12, wherein:
said resource requirements include a call size; and
the decision mechanism includes a comparison mechanism configured to compare said call size with a selected threshold.

17. A system including:
a switching network having a plurality of sending nodes and a plurality of receiving nodes, one of said plurality of sending nodes being a designated sending node and one of said plurality of receiving nodes being a designated receiving node;
a receiver mechanism configured to receive a request for a virtual circuit on said network, said receiver mechanism in communication with at least one of said designated sending node and said designated receiving node;
a determination mechanism configured to examine a set of resource requirements for said request, said determination mechanism in communication with the receiver mechanism; and
a decision mechanism configured to choose whether to dynamically compute a ratio of required resources with quality-of-service restrictions to required resources without such restrictions, responsive to whether any of said resource requirements exceeds a set of selected thresholds, said thresholds determined in response to a network parameter, said decision mechanism in communication with said determination mechanism.

18. The system of claim 17, wherein said switching network is an ATM network.

19. The system of claim 17, wherein said request comprises an incoming call in a telephone network.

20. The system of claim 17, wherein said resource requirements include a call size.

21. The system of claim 17, wherein
said resource requirements include a call size; and
the decision mechanism includes a comparison mechanism configured to compare said call size with a selected threshold.

22. The system of claim 17, further including a rejection mechanism configured to determine whether to reject said request, responsive to said dynamically computed ratio computed by the decision mechanism.

23. An object-oriented software system for selecting routes in a switching network with resource reservation said software system comprising:
an object for receiving a request for a virtual circuit in a switching network, said network having a plurality of sending nodes and a plurality of receiving nodes, said request being received at a sending node;
an object for examining a set of resource requirements for said request; and
an object for choosing whether to dynamically compute a ratio of required resources with quality-of-service restrictions to required resources without such restrictions, responsive to whether any of said resource requirements exceeds a set of selected thresholds, said thresholds determined in response to a network parameter;
wherein a set of actions carried out in operation of said software system are as depicted in the flow diagram of FIG. 1.

24. A software system as in claim 23, wherein said switching network is an ATM network.

25. A software system as in claim 23, wherein said request comprises an incoming call in a telephone network.

26. A software system as in claim 23, wherein said resource requirements include a call size.

27. A software system as in claim 23, wherein
said resource requirements include a call size; and
said step of choosing includes the step of comparing said call size with a selected threshold.

28. A software system as in claim 23, comprising the step of determining whether to reject said request, responsive to said dynamically computed ratio.

* * * * *